United States Patent [19]

Friedmann et al.

[11] Patent Number: 5,342,519
[45] Date of Patent: Aug. 30, 1994

[54] FLUID FILTER CARTRIDGE WITH REPLACEABLE FILTER ELEMENT

[75] Inventors: Francis A. Friedmann, South St. Paul; Wayne M. Wagner, Apple Valley, both of Minn.

[73] Assignee: Donaldson Company, Inc., Minneapolis, Minn.

[21] Appl. No.: 99,906

[22] Filed: Jul. 30, 1993

[51] Int. Cl.⁵ ............................................. B01D 35/30
[52] U.S. Cl. ................................. 210/232; 210/440; 210/450; 210/452; 210/453; 210/DIG. 17
[58] Field of Search ............... 210/232, 440, 443, 444, 210/452, 453, 450, DIG. 17; 55/502, 510

[56] References Cited

U.S. PATENT DOCUMENTS

| | | | |
|---|---|---|---|
| 3,036,711 | 5/1962 | Wilhelm | 210/130 |
| 3,473,666 | 10/1969 | Humbert, Jr. | 210/232 |
| 3,502,218 | 3/1970 | Tuffnell et al. | 210/305 |
| 3,988,244 | 10/1976 | Brooks | 210/295 |
| 4,349,438 | 9/1982 | Sims | 210/180 |
| 4,465,595 | 8/1984 | Cooper | 210/238 |
| 4,622,136 | 11/1986 | Karcey | 210/168 |
| 4,695,377 | 9/1987 | Medley, III | 210/132 |
| 4,717,474 | 1/1988 | Sims | 210/180 |
| 4,767,530 | 8/1988 | Gilliam et al. | 210/232 |
| 4,992,166 | 2/1991 | Lowsky et al. | 210/130 |
| 5,015,375 | 5/1991 | Fleck | 210/232 |
| 5,051,173 | 9/1991 | Hoelzl | 210/143 |
| 5,066,391 | 11/1991 | Faria | 210/85 |
| 5,076,918 | 12/1991 | Foust et al. | 210/238 |
| 5,080,787 | 1/1992 | Brown et al. | 210/232 |
| 5,084,162 | 1/1992 | Conti | 210/232 |
| 5,118,417 | 6/1992 | Deibel | 210/232 |
| 5,171,430 | 12/1992 | Beach et al. | 210/94 |
| 5,182,015 | 1/1993 | Lee | 210/94 |

FOREIGN PATENT DOCUMENTS

| | | |
|---|---|---|
| 3933794 | 4/1991 | Fed. Rep. of Germany . |
| 4022723 | 4/1991 | Fed. Rep. of Germany . |

Primary Examiner—Matthew O. Savage
Attorney, Agent, or Firm—Merchant, Gould, Smith, Edell, Welter & Schmidt

[57] ABSTRACT

A spin-on fluid filter cartridge with a replaceable filter element is provided, comprising a housing, an internally threaded annular collar, a replaceable filter element, and an externally threaded mounting head assembly. The annular collar is secured inside the housing at its open upper end. A sealing ring in an annular channel adjacent the external threads of the mounting head seals the cartridge when the mounting head assembly is threaded into the annular collar.

10 Claims, 2 Drawing Sheets

FLUID FILTER CARTRIDGE WITH REPLACEABLE FILTER ELEMENT

FIELD OF THE INVENTION

This invention relates to fluid filter cartridges, and more particularly, to a spin-on fluid filter cartridge with a replaceable filter element.

BACKGROUND OF THE INVENTION

Filter cartridges for filtering fluids, such as engine oil, are known in the art. Oil filter cartridges are used in internal combustion engines to remove contaminants from the lubricating oil. This reduces engine wear and promotes longer engine life.

The typical oil filter cartridge has a canister or housing with a filter element contained therein which filters oil as it flows through the housing. The housing typically has one end adapted for attachment to the engine block by use of an internally threaded centrally located fluid exit port that threads onto a corresponding externally threaded configuration on the engine block. Oil flows into the housing through fluid inlet holes surrounding the exit port, and filtered oil is returned to the engine through the fluid exit port. The cartridge is typically sealed to the engine block by use of an O-ring gasket around the inlet holes. Fluid filters with such an arrangement for attachment are referred to in the art as "spin-on" filter cartridges.

Disposable or "throw-away" type fluid filters are known in the art. The filter element is permanently sealed within the housing. When the filter element has become clogged with contaminants, the entire cartridge is discarded and a new unit is put in its place. This type of filter is unnecessarily wasteful in that a whole new unit must be used each time the filter cartridge is serviced. As only the filter element has been expended, the useful life of the other individual components has not been utilized. This results in a substantial loss as to the cost of materials and labor that go into manufacturing these components.

Much attention has been recently given to the adverse environmental effects of throw-away filters. Many millions are disposed of each year. Some are thrown in the trash and end up in landfills, often with a substantial amount of oil still contained therein. State and local governments have passed legislation to reduce the adverse environmental impact of disposable filters. Some regulations requires a 24-hour period of drainage to remove excess oil. Others require crushing to reduce volume. In fact, regulations in many areas treat used oil filters as "hazardous waste" requiring special care in their disposal. Substantial fees are often charged for the service of disposal of used filters, such fees often being as high as one-half the purchase price of the filter.

An oil filter cartridge having a detachable cover to permit replacement of the filter element itself is known in the art. U.S. Pat. No. 5,066,391 discloses such a filter cartridge. However, such prior art designs are relatively expensive in that a heavy gauge outer wall for the housing and a separate bottom end cap are required.

The present invention is concerned with a solution to these problems. What has been needed is a simple, low-cost, easy to manufacture, spin-on fluid filter cartridge with a replaceable filter element.

SUMMARY OF THE INVENTION

According to the present invention, a spin-on fluid filter cartridge with a replaceable filter element is provided. The filter cartridge comprises a housing, an annular collar, a replaceable filter element, and a mounting head assembly.

The housing has an annular peripheral wall, a closed end, and an open end. The annular collar is disposed in the open end of the housing and is secured to the housing. The annular collar has internal threads and a peripheral sealing surface adjacent the threads.

The replaceable filter element is disposed in the housing, defining a fluid inlet chamber between the filter element and the housing. The filter element has a hollow cylindrical core which opens to a first end of the filter element, from which filtered fluid flows. A second end of the filter element is closed.

The mounting head assembly has external threads, an annular channel, a sealing ring, a plurality of fluid inlet ports, a tubular filter attachment member, and a fluid outlet port. The external threads of the mounting head assembly are for mating with the internal threads of the annular collar. Adjacent the internal threads is the annular channel in which the sealing ring is disposed. The sealing ring cooperates with the peripheral sealing surface to seal the fluid filter cartridge when the external threads of the mounting head assembly are threaded into the internal threads of the annular collar. The cartridge is mounted by use of a centrally located internally threaded fluid outlet port in the mounting head. A plurality of fluid inlet ports extend through the mounting head. The tubular filter attachment member, in fluid communication with the fluid outlet port, extends into the open first end of the filter element.

Fluid enters the filter cartridge through the fluid inlet ports to fill the fluid inlet chamber. It then moves radially inward under pressure through the filter element and into the hollow cylindrical core. The fluid, now filtered, moves upward in the hollow cylindrical core, through the tubular filter attachment member, and out of the cartridge through the fluid outlet port.

When it is time for the fluid filter cartridge to be serviced, only the filter element is replaced and the remaining components can be reused almost indefinitely. To service the filter cartridge, it is first removed from its mount with the aid of any of various well known tools, as with conventional spin-on cartridges. Oil can be drained from the cartridge by inverting it as with conventional spin-on throw-away cartridges. The mounting head is removed by unscrewing it from the annular collar. The used filter element is removed. The element can be recycled in many ways, such as squeezing or crushing to extract more oil, shredding, and/or incinerating. The housing and mounting head assembly are cleaned. A new filter element is placed onto the tubular filter attachment member and the mounting head assembly is threaded into the annular collar and torqued appropriately. The fluid filter cartridge is now ready for re-installation in the same manner as with conventional spin-on throw away cartridges. The ability to reuse all of the components of the filter cartridge other than the expended filter element not only results in substantial cost savings, but also reduces the adverse environmental impact associated with disposable fluid filter cartridges.

The utilization of a separate threaded collar allows the housing to be manufactured from a lower gauge material than if the threads were cut into the housing itself. This in turn permits the housing to be manufactured as a single unit, without the need for a bottom end cap. Both of these aspects result in a substantial cost savings above prior art devices.

These and other advantages and features of novelty which characterize the invention are pointed out with particularity in the claims annexed hereto. However, for a better understanding of the invention and its advantages, reference should be had to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
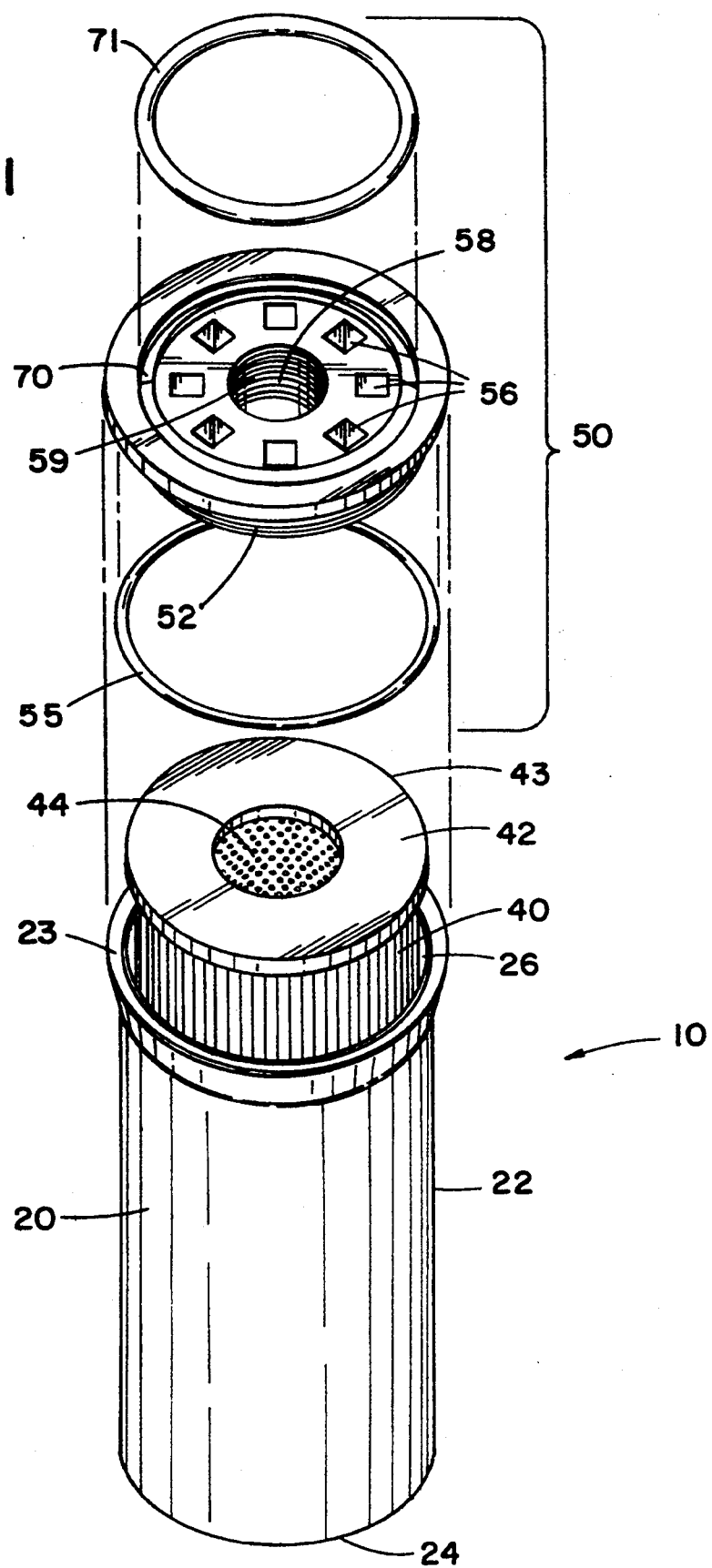
FIG. 1 is an exploded perspective view of a fluid filter cartridge including a housing assembly, a filter, and a mounting head assembly, according to the present invention.
Figure 2:
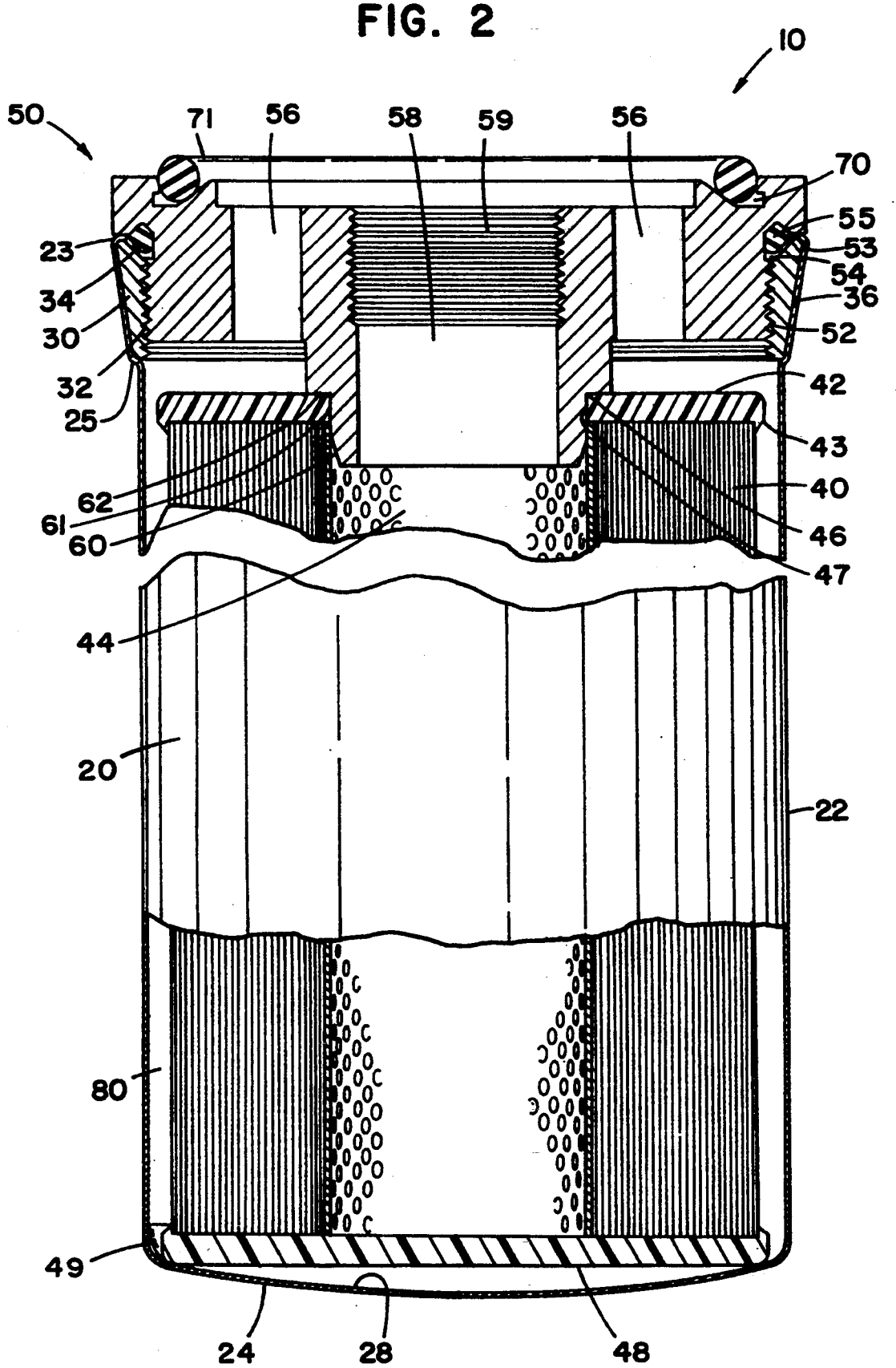
FIG. 2 is an enlarged side view of the fluid filter cartridge shown in FIG. 1 when assembled, a portion thereof being shown in section and a portion thereof being broken away.

Referring now to the drawings, there is illustrated one embodiment of a spin-on fluid filter cartridge 10 with a replaceable filter element 40. While the preferred embodiment is intended for use as an oil filter for an internal combustion engine, the invention could be used in a variety of applications for filtering fluids, including hydraulics, fuel, and water. Cartridge 10 comprises a housing 20, an annular collar 30, a replaceable filter element 40, and a mounting head assembly 50.

Housing 20 has an annular peripheral wall 22, a closed end 24, and an open end 26. In the preferred embodiment, housing 20 is manufactured as a single unit. Housing 20 is deep drawn from sheet metal steel, and preferably has a thickness of between 0.030 and 0.050 inches. While other materials and thicknesses could be employed, these were chosen to minimize cost while providing the necessary durability. The chosen gauge of housing 20 is sufficiently rugged to withstand repeated use, yet sufficiently thin to allow it to be formed to retain annular collar 30, as is more fully discussed below. For comparison purposes, disposable oil filters for automobiles and trucks range in gauge thickness from 0.010 to 0.020 inches.

Annular collar 30 is disposed in end 26 of housing 20. It includes internal threads 32, peripheral sealing support surface 34 adjacent internal threads 32, and bevelled outer annular wall 36.

Annular collar 30 is secured to annular peripheral wall 22 of housing 20 at its open end 26. In the preferred embodiment, a portion 23 of annular peripheral wall 22 is formed over, "spun" or "crimped" onto peripheral sealing support surface 34 of annular collar 30 to secure annular collar 30 within housing 20. Annular collar 30 is supported by shoulder 25 of housing 20, which is formed as a radially outward step in peripheral wall 22 of housing 20. However, those skilled in the art will recognize that annular collar 30 can be secured to housing 20 in a variety of other ways, such as crimping on a retaining lip or welding, thereby making sealing support surface 34 a sealing surface.

Annular collar 30 includes bevelled outer annular wall 36. The bevel angle is preferably sufficient to retain annular collar 30 in housing 20 and to prevent collar 30 from rotating within housing 20. The angle of static friction between two surfaces is equal to the arctangent of the coefficient of friction between the two surfaces. Accordingly, the preferred bevel angle is less than or equal to the arctangent of the coefficient friction between bevelled surface 36 and annular peripheral wall 22 of housing 20, measured from an axially upward direction along a central axis of the housing 20. In the preferred embodiment, annular collar 30 is machined from steel, and the resulting preferred bevel angle is 8.5 degrees.

Replaceable filter element 40 includes hollow cylindrical core 44 and annular end cap 43 at open first end 42. The filter media can be of a variety of materials well known in the art. Annular end cap 43 opens to hollow cylindrical core 44 to define annular inner edge 46. Extending downwardly from inner edge 46 is filter sealing surface 47. End cap 43, and particularly filter sealing surface 47, is preferably of a resilient material capable of providing radial sealing. In the preferred embodiment, end cap 43 is made of urethane with a durometer of approximately between 70A and 80A.

Mounting head assembly 50 includes external threads 52, sealing ring 55 disposed in annular channel 54, fluid inlet ports 56, fluid outlet port 58, and filter attachment member 60. External threads 52 are for mating with internal threads 32 of annular collar 30. When mounting head assembly 50 and annular collar 30 are threaded together, sealing ring 55 is disposed against curled portion 23 of housing 20 to seal filter cartridge 10. In the preferred embodiment, peripheral sealing support surface 34 of annular collar 30 supports curled portion 23 and does not come in contact with sealing ring 55. However, it should be recognized that sealing ring 55 could be sealed against peripheral sealing support surface 34 if a different mechanism for securing annular collar 30 to housing 20 were employed.

In the preferred embodiment, a sealing stop 53 is provided on the outer lower portion of mounting head 50. Sealing stop 53 provides a positive mechanical indication of when filter cartridge 10 is sealed. As mounting head assembly 50 is threaded into annular collar 30, sealing ring 55 is seated and sealed when sealing stop 53 abuts curled portion 23 of housing 20. Sealing stop 53 also increases the clamping force.

A plurality of fluid inlet ports 56 extend through mounting head assembly 50 to receive fluid into filter cartridge 10. It should be noted that fluid could also be received into filter cartridge 10 through a single fluid inlet port 56. In the preferred embodiment, fluid inlet ports provide a second function in that they can be used to assist in removal of mounting head assembly 50 from annular collar 30. Inlet ports 56 are square holes, preferably ½" square in size, to allow insertion of a mounting head assembly 50 removal tool (not shown), such as an impact wrench or ratchet wrench. Mounting head 50 is thus removed by gripping housing 20 and turning the inserted removal tool. It should be recognized, however, that a variety of inlet port shapes could be employed and that a separate aperture could be provided for this purpose.

Fluid outlet port 58 includes internal threads 59 for mounting filter cartridge 10. Filter cartridge 10 can be mounted as with conventional spin-on oil filters by threading into place. Also, as with conventional spin-on oil filters a second sealing ring 71 in a second annular channel 70 surrounding fluid inlet ports 56 is provided to seal filter cartridge 10 when threaded onto an engine. Preferably, the clamping torque created by sealing stop 53 and first sealing ring 55 should be greater than the clamping torque created by second sealing ring 71. Otherwise, when housing 20 is turned to remove filter cartridge 10, mounting head assembly 50 would remain in place causing oil to spill and requiring separate removal of mounting head assembly 50.

When filter cartridge 10 is assembled, tubular filter attachment member 60 extends into hollow cylindrical core 44 of filter element 40 at open first end 42. Filter element 40 and housing 10 define a fluid inlet chamber 80 between filter element 40 and housing 10. Fluid is filtered as it passes radially inward from fluid inlet chamber 80, through the filter media, and through perforations in the inner wall of filter element 40, to hollow cylindrical core 44. Filtered fluid passes through filter attachment member and out of filter cartridge 10 through fluid outlet port 58.

In the preferred embodiment, sealing between filter element 44 and filter attachment member 60 is provided by a compressed fit between outer surface 61 of filter attachment member 60 and filter sealing surface 47 to create a radial seal. Alternatively, a sealing ring could be employed between outer surface 61 of filter attachment member 60 and filter element 40.

In the preferred embodiment, a shoulder 62 on filter attachment member 60 presses closed second end 48 of filter element 40 downward and against bottom surface 28 of housing 20. This arrangement eliminates the need for a spring which is typically placed between the bottom surface 28 of housing 20 and filter element 40 in order to bias filter element 40 upward to assure proper sealing. Three positioning tabs 49, equally spaced at 120° intervals on second end 48 are employed in the preferred embodiment to support and center filter element 40.

It should be understood that the present invention is not limited to the preferred embodiment discussed above, which is illustrative only. Changes may be made in detail, especially in matters of shape, size, arrangement of parts, and material of components within the principals of the invention, to the full extent indicated by the broad general meanings of the terms in which the appended claims are expressed.

What is claimed is:

1. A reusable fluid filter cartridge, comprising:
   (a) a housing having an annular peripheral wall, a closed end, and an open end;
   (b) an annular collar disposed in said open end of said housing, said annular collar having internal threads and peripheral sealing surface means adjacent said internal threads;
   (c) means for securing said annular collar to said housing at said open end;
   (d) a replaceable filter element disposed in said housing to define a fluid inlet chamber between said filter element and said housing, said filter element having a hollow cylindrical core which opens to a first end of said filter element, permitting filtered fluid to flow therefrom, and having a closed second end, said filter element having an outer diameter that is smaller than an inner diameter of both said housing and said collar to permit removal of said filter element through the open end of said housing; and
   (e) a mounting head assembly having:
      (i) external threads for mating with said internal threads of said annular collar;
      (ii) an annular channel adjacent said external threads;
      (iii) a sealing ring disposed in said annular channel, said sealing ring creating a first seal in cooperation with said peripheral sealing surface means of said annular collar when said external threads of said mounting head assembly are threaded into said internal threads of said annular collar;
      (iv) fluid inlet means extending through said mounting head assembly in fluid communication with said fluid inlet chamber; and
      (v) a tubular filter attachment member extending into said open first end of said filter element, said filter attachment member having a fluid outlet port in fluid communication with said hollow cylindrical core and an outer surface sealingly engaging said open first end.

2. The fluid filter cartridge of claim 1, wherein said securing means comprise a formed portion of said annular peripheral wall of said housing formed over said annular collar, said formed portion securing said collar in said open end of said housing.

3. The fluid filter cartridge of claim 2, wherein said sealing ring disposed in said annular channel of said mounting head assembly is biased against said formed portion of said annular peripheral wall to create said first seal, said formed portion abutting said peripheral sealing surface means.

4. The fluid filter cartridge of claim 2, further comprising means for indicating positive sealing and for increasing clamping force when said mounting head assembly is threaded into said annular collar, said means for indicating positive sealing and for increasing clamping force including a mechanical contact between said mounting head assembly and said formed portion of said annular peripheral wall of said housing.

5. The fluid filter cartridge of claim 1, wherein said housing is deep drawn from sheet-metal steel and has a thickness of approximately 0.030 to 0.050 inches.

6. The fluid filter cartridge of claim 1, wherein said fluid outlet port includes internal threads, said mounting head assembly further comprising means for providing a second seal when said filter cartridge is installed by threading said fluid outlet port into position, the clamping force of said first seal being sufficient to overcome the clamping force of said second seal providing means so as to cause said second seal providing means to release prior to said first seal when said cartridge is removed.

7. The fluid filter cartridge of claim 1, further comprising means for removing said mounting head assembly from said annular collar, said removing means including an axially aligned aperture in said mounting head assembly, said aperture being shaped to allow insertion of a head removing tool to permit removal of said mounting head assembly when said removing tool is turned.

8. The fluid filter cartridge of claim 1, wherein said annular collar has a bevelled outer annular wall, the angle of said bevelled wall relative a central axis of said housing being less than the arctangent of the coefficient of friction between said bevelled wall and said annular peripheral wall of said housing.

9. The fluid filter cartridge of claim 1, wherein said replaceable filter element further has an annular end cap on said open first end, said end cap having an inner edge defined by an opening in said end cap to said hollow cylindrical core and a filter sealing surface disposed adjacent said inner edge, said filter sealing surface providing a radial seal with said outer surface of said tubular filter attachment member.

10. The fluid filter cartridge of claim 9, wherein said filter attachment member includes a shoulder which biases said closed second end of said replaceable filter element against an interior surface of said housing.

* * * * *